Figure 1:
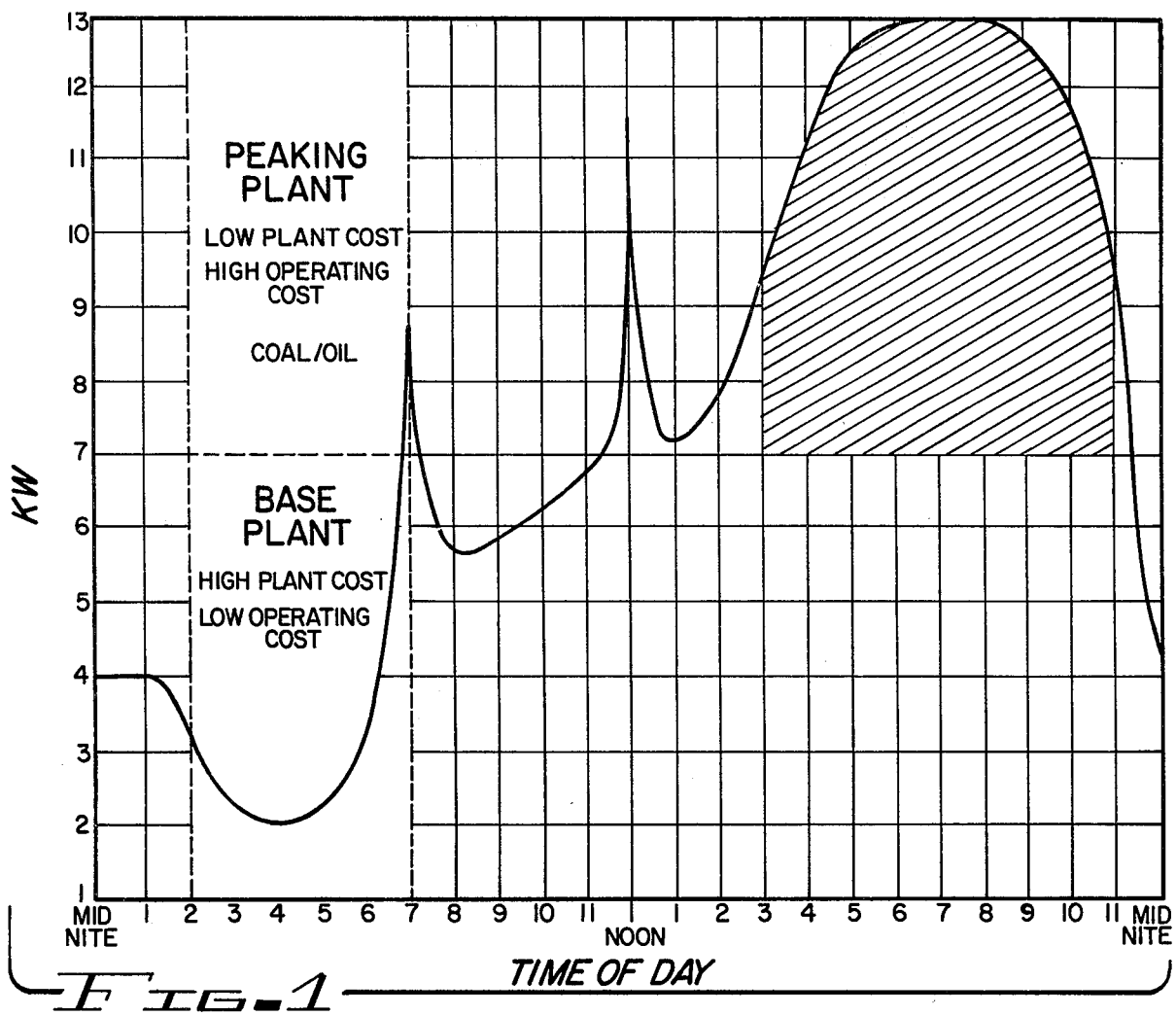

United States Patent [19]

Hedges et al.

[11] 4,211,933

[45] Jul. 8, 1980

[54] ELECTRICAL LOAD RESTORATION METHOD

[75] Inventors: Walter P. Hedges, Laveen; C. Gardner Sullivan, II, Phoenix, both of Ariz.

[73] Assignee: Cyborex Laboratories, Inc., Phoenix, Ariz.

[21] Appl. No.: 909,850

[22] Filed: May 26, 1978

[51] Int. Cl.² .............................................. H02J 3/14
[52] U.S. Cl. ........................................ 307/35; 307/38
[58] Field of Search ...................... 307/38, 39, 33, 34, 307/35, 41; 364/492, 493

[56] References Cited

U.S. PATENT DOCUMENTS

| | | | |
|---|---|---|---|
| 3,652,838 | 3/1972 | Dillon et al. | 364/493 |
| 4,064,485 | 12/1977 | Leyde | 307/39 X |
| 4,075,699 | 2/1978 | Scheider et al. | 364/492 |
| 4,146,923 | 3/1979 | Borkan | 364/492 X |

*Primary Examiner*—L. T. Hix
*Assistant Examiner*—James L. Dwyer
*Attorney, Agent, or Firm*—William H. Drummond

[57] ABSTRACT

An energy management method employing apparatus for automatically limiting the total instant consumption of electrical energy in a residential circuit having a plurality of energy-consuming variable demand loads having different nominal current demands. A predetermined load shedding sequence is established which is independent of the nominal current demands of the load. The actual current consumption value of each load shed is measured. Shed loads are restored which, according to their actual values and independent of their nominal values, can be restored without causing the total current in residential circuit to exceed the preselected demand. Measurement of the consumption values of the shed loads enables load restoration selections based thereon without modification of the energy management apparatus to account for variations in the nominal demands of the loads.

In a presently preferred embodiment the total current loads in the total current demand is periodically remeasured and additional loads are restored if the actual current demand thereof, added to the actual demands of the loads then in operation, do not exceed the predetermined peak demand.

In a further presently preferred embodiment, the loads are automatically restored sequentially if possible. But if not possible, the priority sequence is ignored and loads of lower priority are restored, if possible without exceeding the predetermined peak demand.

3 Claims, 2 Drawing Figures

ELECTRICAL LOAD RESTORATION METHOD

This invention relates to an electrical energy management system.

More specifically, the invention concerns an electrical energy management system especially adapted for controlling the total electrical energy consumption of a circuit which includes a plurality of loads having different current demands.

In another aspect, the invention concerns an energy management system for automatically restoring to operation those loads which have been shed which can be restored without causing the total current to exceed the preselected peak total current demand, thereby assuring the user of the availability of use of all of the loads which can be used without exceeding the predetermined peak demand.

In a still further respect, the invention concerns an energy management system which, when utilized to control peak demand for a plurality of separate utility customers, assures the utility of maximum usage of its generating facilities then in operation, without requiring the utility to place additional generating facilities on line.

With the advent of higher fuel prices and increased capital costs, electrical utility companies have sought, and in some cases have been required by governmental regulation, to seek means for reducing the overall cost to the customer of electrical energy provided by the utility.

Various energy management systems have been proposed which require or at least attempt to persuade utility customers to limit their electrical energy consumption as a means of reducing their overall utility bills. According to one such proposal, the maximum load which each customer is allowed to place on the utility's power generation facilities is arbitrarily limited. Although this "peak usage curtailment" approach is partially effective in reducing the customer's overall utility bills, it has several decided disadvantages. The customer, especially a residential user, loses a degree of flexibility in selecting and using various electrical appliances, etc., in his residence and to this extend, the peak usage curtailment program has direct and often undesirable impact on the customer's lifestyle. Secondly, the utility itself may find that the reduction in total electrical energy consumption reduces the utility's revenue to the point that it must, in turn, raise the utility charge per unit of electrical power consumed to the point that the user's electrical utility bills may even exceed the bills he customarily received before his power usage was curtailed.

It would be highly advantageous to provide an electrical energy management system which is particularly adapted for use in peak load curtailment programs as applied to residential customers which would allow arbitrary peak load limits to be imposed upon the customers with the minimum possible effect on the customer's lifestyle while, simultaneously, maintaining the total usage of power by the customer at or just below the predetermined permissible peak demand, thereby assuring the utility company of the optimum use of its generating facilities.

Accordingly, a principal object of the present invention is to provide an improved energy management system for use in connection with peak usage curtailment programs.

Another object of the invention is to provide such an energy management system which is especially adapted for use by residential customers.

Still another object of the invention is to provide a residential energy management system which applies an arbitrary peak demand limit while retaining maximum flexibility of use of various residential appliances and maintaining power consumption consistent with the peak usage curtailment program.

Figure 2:
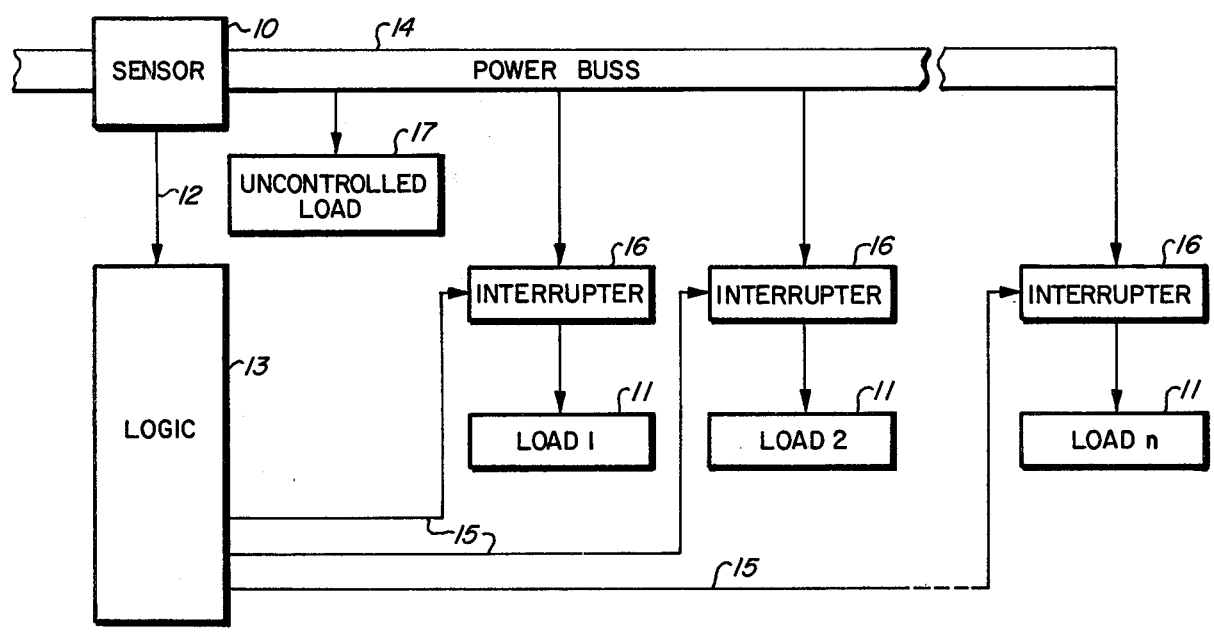

These and other objects and advantages of the invention will be apparent to those skilled in the art from the following detailed description thereof, taken in conjunction with the drawings, in which:

FIG. 1 is a chart showing the power consumed at various times of the day in an average residence, during the summertime; and FIG. 2 illustrates the interrelationship of the components of an energy management system embodying the present invention.

Briefly, in accordance with my invention, I provide an energy management system for automatically limiting the total instantaneous consumption of electrical energy in a residence having a plurality of energy consuming loads with different current demands, while maintaining the consumption as high as possible without exceeding a predetermined peak total current demand. The system comprises sensor means for measuring the total current to the loads which are then in operation, current interruption means for automatically interrupting the current, if any, to each of the loads in a predetermined sequence, when the total current to the loads then in operation exceeds the predetermined peak demand. These loads are shed in the predetermined sequence until the total current is less than the predetermined peak total. Means are provided for selecting from among those loads which have been interrupted, the loads which can be restored without causing the total current to exceed the preselected peak demand and for automatically restoring the selected loads to operation.

In a further embodiment of the invention, means are also provided for periodically remeasuring the total current and restoring an additional load to operation if the current demand thereof, added to the demands of the loads then in operation, does not exceed the predetermined peak total current demand.

In the preferred embodiment of the invention, the loads are restored sequentially, if possible, without exceeding the predetermined peak demand.

The problems encountered in imposing a peak usage curtailment program on a residential electrical utility customer are best appreciated by reference to FIG. 1 which shows the electrical demand of a typical residence at various hours during summer weather when residential air-conditioning is employed. In the hours just before and just after midnight, the demand is relatively very low, but rises to a moderate peak at about 7:00 A.M. as occupants of the house rise, take baths, prepare breakfast, etc. The demand then falls to a moderate level during the forenoon and rises to a second higher peak around noontime, as the cooking and dishwashing facilities are once again utilized. Meanwhile, the air-conditioning load is steadily increasing as the ambient temperatures increase and this effect becomes predominant during the afternoon and early evening hours. At sunset, approximately 7:00–8:00 P.M., as ambient temperatures begin to cool and usage of other household appliances is reduced, the demand falls off rapidly to the midnight level, as shown.

The effect of the demand curve for a single residence, as shown in FIG. 1, multiplied many thousands of times is reflected in a similar variation in the demand placed on a utility company's power generating facilities. As indicated in FIG. 1, most utility companies have a so-called "base plant" such as, for example, hydroelectric facilities, nuclear generating facilities, etc., which has a high capital cost but a relatively low operating cost. The base plant is typically capable of supplying the power requirements of its residential customers up to a median level, for example, to about 7 KW per residence. However, when the demand per residence rises above this level, the total demand on the utility's generation facilities is increased to the point that additional standby generation facilities, such as oil or coal fueled steam-driven generators, must be placed on line to supply the peak demand occurring in the afternoon and early evening. These "peaking plant" facilities generally have lower capital cost, but relatively high operating cost.

The theory of peak usage curtailment is that by imposing an arbitrary upper limit on the instantaneous power consumption permitted at any one residence, the customer must shift his usage of certain of his appliances to the "off-peak" hours if he is to retain the ability to use essential appliances such as air-conditioning in the "on-peak" period. Thus, in the case of the residence typified by FIG. 1, if an arbitrary peak demand of 9 KW is placed on the residence, the customer must find ways to reduce his power consumption from 3:00 P.M. until 11:00 P.M. or he will be unable to use his air-conditioning system. Thus, activities such as clothes washing and drying, cooking for dinner, etc., must be shifted to an earlier part of the day, for example, during the early morning and forenoon. This has the effect of shifting a significant part of the energy consumed by the residence from the peak hours to the off-peak hours. The end effect is a reduction in the cost of the power utilized by the consumer because more of the power he consumes is generated by the base plant and less of the power he consumes is generated by the peaking plant, resulting in an overall reduction in his utility bill.

Load-shedding devices which limit power consumption in residences, places of business and manufacturing plants are well-known in the art. Such load-shedding devices usually consist of a sensor for measuring total energy consumption of a residence or the like and means such as relays for shedding loads in a predetermined sequence when the demand exceeds the predetermined peak demand. Restoration of the loads may be automatic or manual but, until now, no energy management system has been devised which will automatically restore a load out of sequence if the restoration of that load can be accomplished without exceeding the imposed peak demand limit. Thus, while the prior art load-shedding and restoring systems do have the effect of reducing the peak load on the utility and shifting some of the energy usage to the former "off-peak" hours, the prior art systems also have the effect of significantly reducing the total power usage by the customer. Since the capital investment of the utility company must be amortized without reference to the amount of power consumed, the utility is then forced to raise its unit price for power charged to the consumer. This cost increase may be so high that the customer's utility bill is actually increased, rather than decreased.

According to the energy management system which we have devised, the primary objective of a peak usage curtailment program, shifting of power consumption from peak of off-peak hours, is accomplished while optimizing the demand on the utility generating facilities. Thus, the consumer is forced to utilize cheaper power but his total consumption is not reduced nearly as drastically, limiting or reducing the size of increases in the unit cost of power which he consumes.

As shown in FIG. 2, the objectives of the invention are achieved by placing a sensor 10 in the power buss which measures the total current in the buss to the loads 11 which are then in operation. The sensor may be a conventional utility meter, modified to sense the instantaneous current in the buss and to generate an electronic signal indicating the total current. Alternatively, a separate current sensor of any well known type may be employed. At any rate, the current indicating signal 12 from the sensor is supplied to the logic 13 of a computer, preferably a microprocessor. When the current in the power buss 14 exceeds the predetermined peak demand, the logic 13 of the microprocessor generates signals 15 which control current interrupters 16 which are in series electrical connection with the loads 11. The computer logic 13 is programmed to activate the interrupters 16 so as to shed the loads 11 in a predetermined sequence when the total current in the power buss 14 exceeds the predetermined peak demand. After shedding sufficient loads to reduce the actual current in the power buss 14 to a point equal to or less than the predetermined peak total, the logic 13 then determines whether any of the loads which have been shed can be restored to operation without exceeding the predetermined peak demand. If so, that load is automatically restored to operational status.

Periodically the logic 13 compares the actual current in the power buss 14 with the predetermined peak demand and, when it is posible, the logic restores additional loads to operation. When an operating load is shed, the logic 13 measures the value of the load shed. This information is stored in its memory and is used in determining whether the load can be restored during the subsequent periodic remeasurement. As indicated in FIG. 2, the total loads in the residence may include uncontrolled loads 17 but, whether such uncontrolled loads are present or not, the system will function as described above.

The energy management system of the present invention provides the customer with maximum flexibility in operating the various controlled and uncontrolled appliances in his residence. Upon installation of the system, the customer can direct the utility company to program the microprocessor in such fashion as to shed and restore the various controlled loads in any desired sequence, according to the customer's priorities. Therefore, the system will automatically place the appliances in operation whenever there is space for the electrical load of the particular appliance in the peak demand load imposed on the system. At the same time, while providing this flexibility to the customer, the system of the present invention satisfies the utility's objective of selling and providing the maximum amount of power to the customer consistent with the objectives of the peak usage curtailment program.

Having described our invention in such terms as to enable those skilled in the art to understand and practice it, and having identified the presently preferred embodiments thereof, we claim:

1. In an energy management method employing apparatus for automatically limiting the total instantaneous consumption of electrical energy in a residence having a plurality of energy-consuming variable demand loads having different nominal current demands, said method including measuring the total current to the loads which are then in operation, and automatically interrupting the current, if any, to each of said loads in a predetermined sequence when the total current to the loads then in operation exceed the predetermined peak total current demand, until the total current is less than the predetermined peak total, the improvement whereby current consumption is maintained as high as possible without exceeding said predetermined peak demand, said improvement comprising:

(a) establishing a predetermined load shedding sequence which is independent of the nominal current demands of said loads;

(b) measuring the actual consumption values of each load which is interrupted;

(c) selecting from among those loads which have been interrupted, the loads which, according to said actual values and independent of said nominal values, can be restored without causing said total current to exceed predetermined peak demand; and (d) automatically restoring said selected loads to operation;

the measurement of said actual consumption values enabling load restoration selections based thereon without modification of said energy management apparatus to account for variations in the nominal demands of said loads.

2. Method of claim 1, which includes the steps of:
(a) periodically re-measuring said total current; and
(b) restoring an additional load to operation if the current demand thereof, added to the demands of the loads then in operation, does not exceed said predetermined peak total current demand.

3. Method of claim 1, in which said loads were automatically restored sequentially, if possible, without exceeding said predetermined peak demand.

* * * * *